May 20, 1924.                                                1,494,669
J. M. CROM
CEMENT GUN
Filed Feb. 23, 1923

John M. Crom.
INVENTOR.

BY *Marke Clark*

ATTORNEYS

Patented May 20, 1924.

1,494,669

UNITED STATES PATENT OFFICE.

JOHN MAURICE CROM, OF CHICAGO, ILLINOIS, ASSIGNOR TO CEMENT-GUN COMPANY, INC., OF ALLENTOWN, PENNSYLVANIA, A CORPORATION OF NEW YORK.

CEMENT GUN.

Application filed February 23, 1923. Serial No. 620,752.

*To all whom it may concern:*

Be it known that JOHN MAURICE CROM, citizen of United States, residing at Chicago, State of Illinois, U. S. A., has invented certain new and useful Improvements in Cement Guns, of which the following is a specification.

This invention relates in a general way to apparatus for applying plastic material, such as hydraulic cement or similar material to walls or other surfaces to be coated, and more particularly it relates to the feeding means of such apparatus.

In apparatus of this character the dry comminuted material is brought under pressure to the point of delivery adjacent to the point of application. Through a separate conduit water under pressure is brought to the same point of delivery and the two elements together are forcibly projected against the structure or object which is to be coated or which is to act as a form in depositing a body of plastic material. In order to prevent clogging due to the introduction of too much material into the conduit at one time, the feeding is accomplished by means of pockets provided in the periphery of a revolving wheel, which pockets are brought successively under the influence of a jet of air which causes the material contained in such pockets to be blown through a hose to the point of delivery where the hydration takes place.

As constructed and operated hitherto, the feeding means just mentioned has certain disadvantages. The material has a tendency to bunch or lump around the so-called "gooseneck" through which compressed air is admitted to the pockets. This causes irregular feeding and results in improper hydration and imperfect coating.

It is the object of the present invention to avoid this drawback by improving the feeding means of the apparatus so as to insure uniform feed. This is accomplished according to my invention, by the provision of means for preventing the feeding of material from more than one pocket at one time. Another advantage of my new arrangement is that there is no waste of compressed air and that the application or "placing" of the material can be accomplished with a relatively small amount of air and under low pressure, the material being blown out in suspension. Still another advantage of my invention is that it enables the apparatus to be used for feeding and placing very dry and finely granulated material, such as for instance refractory material. The objects and advantages of my invention will appear fully from the description following hereinafter and the novelty will be pointed out in the appended claims.

Figure 1:
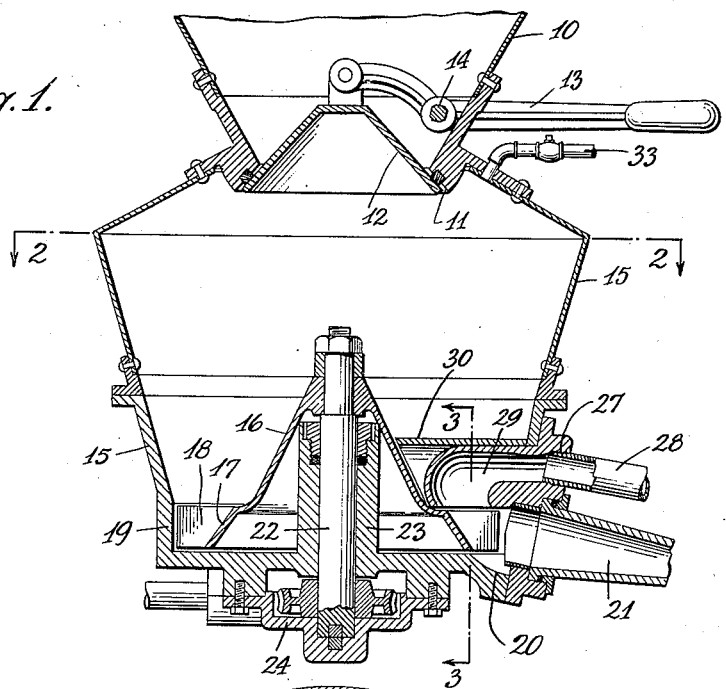
Figure 2:
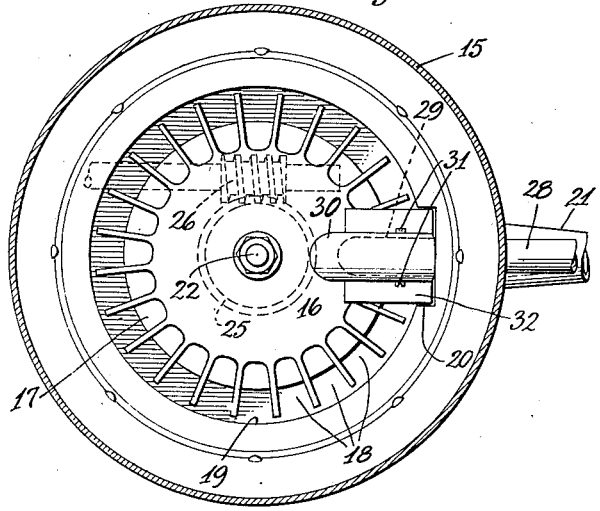
Figure 3:
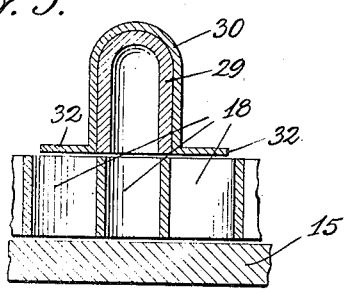

In the accompanying drawings I have illustrated an example of my invention without defining its limits. In these drawings Fig. 1 is a vertical section through an apparatus embodying my improved feeding device; Fig. 2 is a horizontal section taken on line 2—2 of Fig. 1; and Fig. 3 is an enlarged detail section taken on line 3—3 of Fig. 1.

The apparatus shown in the drawings comprises a receptacle 10 having at its lower end an opening 11 normally closed by a cone valve 12 operated by means of a lever 13 fulcrumed at 14. The receptacle 10 may be closed at the top by a valve (not shown) similar to the valve 12; this, however, is not essential to my invention. The opening 11 leads into a receptacle 15 which is preferably reduced from its upper toward its lower portion and contains in said lower portion a feed wheel 16 having a conical portion the lower end of which is formed with pockets 18 open at the top and at their outer sides. These outer ends of the pockets 18 are closed by a straight wall 19 forming part of the receptacle 15. This wall 19 is continuous except at one point at which there is provided an opening 20 leading into an outlet conduit 21. The pockets 18 are arranged concentrically around a vertical shaft 22 carrying the feed wheel 16 and extending through a bearing 23 formed in the bottom of the receptacle 15. The shaft 22 is supported in a bearing 24 bolted to the receptacle bottom, and it may be rotated by means of worm gearing 25, 26 driven in any suitable manner (not shown).

Above the outlet opening 20 is arranged an inlet opening 27 connected with a supply pipe 28 which receives a supply of compressed air or the like from any suitable source (not shown). Inside the receptacle 15, in registry with the opening 27, is arranged a gooseneck pipe 29 the free end of which opens downwardly, in registry with the upper opening of one of the pockets 18. Arranged over the gooseneck pipe 29 in such a manner as to straddle it, is a hood 30 extending radially from the wall of the receptacle 15 to the conical surface 17 of the feed wheel 16, the end surfaces of the hood 30 being inclined to conform to such wall and conical surface. The hood 30 may be clamped to the gooseneck 29 as by screws 31. At its lower end the hood 30 is provided with transverse flanges 32 extending away from the sides of the hood in a horizontal direction in a plane close to the upper surface of the pockets 18 in the feed wheel 16.

The operation of the device is as follows: After the receptacle 15 has been filled with material to the desired level by opening the cone valve 12, the feed wheel 16 is set in motion, the rotation being preferably intermittent so as to bring the pockets 18 with the material contained therein into registry with the outlet opening 21. As soon as the wheel 16 stops with one of its pockets in such registering position, a blast of compressed air or the like is set up through the gooseneck 29. This blast of air will blow the material contained in the pocket through the outlet 20 into the conduit 21 and carry it along to the place of delivery where it is mixed with water and forcibly projected against the surface to be coated. This operation is repeated as the pockets are brought successively into registry with the outlet opening 21. The steps of the operation are so timed that a practically continuous supply of material at the delivery point is insured.

Owing to the provision of the hood 30 and to the fact that it extends from the wall of the receptacle 15 to the conical surface 17 of the feed wheel 16, the material is prevented from bunching or humping around the gooseneck 29. The arrangement of parts is such that at any time only one of the pockets is exposed to the blast of compressed air. The flanges of the hood extend over the adjacent pockets and prevent their contents from being disturbed by the air blast. Inasmuch as practically no air escapes into the receptacle 15, it is evident that the feeding and placing of the material can be effected with a relatively small amount of air and under low pressure. The flanges 32 on the hood 30 furthermore have the advantage of cutting off or separating the material in the cups or pockets from the material above such pockets; the flanges thus have the effect of regulating the amount of material in the pockets, and it will be evident that a uniform supply of material to the outlet conduit is thus insured.

If desired, the material in the receptacle 15 may be at all times under the influence of compressed air and for this purpose an air supply connection 33 has been indicated in Fig. 1.

Various modifications may be made without departing from the nature of my invention as set forth in the appended claims.

I claim:

1. In apparatus of the character described, a receptacle having an outlet, a feed wheel having circumferentially - arranged pockets adapted to register successively with said outlet and having all of its pockets entirely enclosed within said receptacle at all times, an air inlet connection arranged above said outlet and in registry with one of said pockets, and a hood also enclosed within the said receptacle covering said inlet connection.

2. In apparatus of the character described, a receptacle having an outlet, a feed wheel having a conical wall and pockets arranged circumferentially around said wall and adapted to register successively with said outlet and having all of its pockets entirely enclosed within said receptacle at all times, an air inlet connection arranged above said outlet and in registry with one of said pockets, and a hood also enclosed within the said receptacle covering said inlet connection and extending from the wall of said receptacle to said conical wall.

3. In apparatus of the character described, a receptacle having an outlet, a feed wheel having a conical wall and pockets arranged circumferentially around said wall and adapted to register successively with said outlet and having all of its pockets entirely enclosed within said receptacle at all times, an air inlet connection arranged above said outlet and in registry with one of said pockets, and a hood also enclosed within the said receptacle covering said inlet connection and extending from the wall of said receptacle to said conical wall, the end surfaces of said hood conforming to the outline of said receptacle wall and of said conical wall.

4. In apparatus of the character described, a receptacle having an outlet, a feed wheel having circumferentially - arranged pockets adapted to register successively with said outlet and having all of its pockets entirely enclosed within said receptacle at all times, an air inlet connection arranged above said outlet and in registry with one of said pockets, and a hood also enclosed within the said receptacle covering said inlet connection, and having a flange extending rearwardly in the direction of rotation of said feed wheel.

5. In apparatus of the character described, a receptacle having an outlet, a feed wheel having circumferentially - arranged pockets adapted to register successively with said outlet and having all of its pockets entirely enclosed within said receptacle at all times, an air inlet connection arranged above said outlet and in registry with one of said pockets, and a hood also enclosed within the said receptacle covering said inlet connection and having flanges extending to both sides so as to cover the pockets which are nearest to that which is in registry with said outlet.

In testimony whereof I have affixed my signature in presence of two witnesses.

JOHN MAURICE CROM.

Witnesses:
M. V. BROWN,
J. C. COLLIER.